US012572700B1

(12) United States Patent　　　　(10) Patent No.:　US 12,572,700 B1

Ezrielev et al.　　　　　　　　　　　 (45) Date of Patent:　　Mar. 10, 2026

(54) MANAGING CORROBORATED DATA

(71) Applicant: Dell Products L.P., Round Rock, TX (US)

(72) Inventors: Ofir Ezrielev, Be'er Sheva (IL); Tomer Kushnir, Omer (IL); Yehiel Zohar, Sderot (IL)

(73) Assignee: Dell Products L.P., Round Rock, TX (US)

( * ) Notice: Subject to any disclaimer, the term of this patent is extended or adjusted under 35 U.S.C. 154(b) by 33 days.

(21) Appl. No.: 18/928,809

(22) Filed: Oct. 28, 2024

(51) Int. Cl.
　　*G06F 21/64*　　　(2013.01)
　　*G06F 21/45*　　　(2013.01)
(52) U.S. Cl.
　　CPC .............. *G06F 21/64* (2013.01); *G06F 21/45* (2013.01)
(58) Field of Classification Search
　　CPC ........................................................ G06F 21/64
　　See application file for complete search history.

(56) References Cited

U.S. PATENT DOCUMENTS

| 8,060,812 | B2 | 11/2011 | Branda et al. |
| 8,126,820 | B1 | 2/2012 | Talan |
| 8,392,702 | B2 * | 3/2013 | Qiu ....................... H04L 63/101 |
| | | | 380/279 |
| 8,650,646 | B2 | 2/2014 | Rubin et al. |
| 8,856,936 | B2 | 10/2014 | Datta Ray et al. |

(Continued)

FOREIGN PATENT DOCUMENTS

| CN | 113811913 B | 11/2022 |
| CN | 118153979 A | 6/2024 |

(Continued)

OTHER PUBLICATIONS

"Digital Authenticity: Provenance and Verification in AI-Generated Media". Webpage <https://www.numbersprotocol.io/blog/digital-authenticity-provenance-and-verification-in-ai-generated-media>, 9 pages, Dec. 5, 2023, retrieved from Internet Archive Wayback Machine <https://web.archive.org/web/20240113104942/https://www.numbersprotocol.io/blog/digital-authenticity-provenance-and-verification-in-ai-generated-media> on Sep. 26, 2024.

(Continued)

*Primary Examiner* — Simon P Kanaan

(74) *Attorney, Agent, or Firm* — WOMBLE BOND DICKINSON (US) LLP

(57)　　　　　　　ABSTRACT

Methods and systems for managing data used to provide computer-implemented services are disclosed. To manage the data, a request for corroborated data may be obtained from a data consumer indicating a desired information content and a threshold level of trust. Based on the request, the corroborated data may be obtained from a corroborated data database which has the desired information content and a level of trust that meets the level of trust threshold. The corroborated data may be obtained from a first data source and may be corroborated using at least one other data source adapted to measure a similar information content to the desired information content which the first data source may be adapted to measure. The level of trust may be based on a corroboration schema. At least a portion of the corroborated data may be provided to the data consumer to facilitate provisioning of the computer-implemented services.

20 Claims, 8 Drawing Sheets

(56) References Cited

U.S. PATENT DOCUMENTS

| | | | |
|---|---|---|---|
| 9,043,458 B2 * | 5/2015 | Balaji | H04L 67/10 |
| | | | 709/224 |
| 9,563,782 B1 | 2/2017 | Brisebois | |
| 10,122,775 B2 | 11/2018 | Rosenberg | |
| 10,140,466 B1 | 11/2018 | Brisebois | |
| 11,059,348 B2 | 7/2021 | Yu et al. | |
| 11,314,492 B2 | 4/2022 | Jain | |
| 11,354,602 B2 | 6/2022 | Kursun | |
| 11,704,409 B2 | 7/2023 | Miller et al. | |
| 11,861,937 B2 | 1/2024 | Han et al. | |
| 12,204,507 B1 * | 1/2025 | Ghosh | G06Q 40/125 |
| 2004/0093323 A1 | 5/2004 | Bluhm | |
| 2008/0244526 A1 | 10/2008 | Chang | |
| 2009/0319539 A1 | 12/2009 | Soppet | |
| 2010/0250605 A1 | 9/2010 | Pamu | |
| 2011/0060664 A1 | 3/2011 | Bezos | |
| 2011/0088086 A1 | 4/2011 | Swink | |
| 2013/0239170 A1 | 9/2013 | Ziemann | |
| 2015/0113002 A1 | 4/2015 | Nadarajah | |
| 2015/0281222 A1 * | 10/2015 | Burch | H04L 63/0838 |
| | | | 726/6 |
| 2016/0005004 A1 | 1/2016 | Trabue | |
| 2016/0210427 A1 | 7/2016 | Mynhier | |
| 2016/0357980 A1 | 12/2016 | Balasubramanian | |
| 2018/0284712 A1 | 10/2018 | Mathur | |
| 2018/0336571 A1 | 11/2018 | Gilani | |
| 2019/0349204 A1 | 11/2019 | Enke et al. | |
| 2020/0152321 A1 | 5/2020 | Perry | |
| 2020/0183911 A1 | 6/2020 | Patel | |
| 2020/0202308 A1 | 6/2020 | Cattone | |
| 2021/0142217 A1 * | 5/2021 | Valline | G06F 16/245 |
| 2021/0217092 A1 | 7/2021 | Webster | |
| 2021/0250361 A1 * | 8/2021 | Leibmann | G06F 21/33 |
| 2022/0345523 A1 | 10/2022 | Maity | |
| 2022/0391821 A1 | 12/2022 | Boyd | |
| 2023/0412626 A1 * | 12/2023 | Wright | H04L 41/16 |
| 2024/0202737 A1 | 6/2024 | Sethi | |
| 2025/0190612 A1 * | 6/2025 | Chandrashekar | G06F 21/6227 |
| 2025/0245773 A1 * | 7/2025 | Hanes | H04N 7/18 |

FOREIGN PATENT DOCUMENTS

| | | |
|---|---|---|
| CN | 118317314 A | 7/2024 |
| GB | 2456742 A | 7/2009 |
| GB | 2507837 A | 5/2014 |
| WO | 2024091682 A1 | 5/2024 |
| WO | 2024186954 A2 | 9/2024 |

OTHER PUBLICATIONS

Adam Rowe, "9 Simple Ways to Detect AI Images (With Examples) in 2024", tech.co, Nov. 22, 2023, retrieved from <https://tech.co/news/ways-detect-ai-images-examples> on Sep. 26, 2024 (6 pages).

Zhong et al., "Rich and Poor Texture Contrast: A Simple yet Effective Approach for AI-generated Image Detection", arXiv:2311.12397v2, Dec. 10, 2023 (17 pages).

Sina Mchunu, "How to Detect AI Content in 2024", WebFX, May 19, 2023, retrieved from <https://www.webfx.com/blog/content-marketing/how-to-detect-ai-content/> retrieved on Sep. 26, 2024 (12 pages).

Rachel Gordon, "Better fact-checking for fake news", MIT News on Campus and Around the World, Oct. 17, 2019 (7 pages).

Harran et al., "A Method for Verifying Integrity and Authenticating Digital Media", Forensic Focus, Jun. 9, 2017, retrieved from <https://www.forensicfocus.com/articles/a-method-for-verifying-integrity-and-authenticating-digital-media/> on Sep. 26, 2024 (16 pages).

Boland et al., "Ten Simple Rules to Enable Multi-site Collaborations through Data Sharing", PLoS Comput Biol. Jan. 19, 2017;13(1):e1005278. doi: 10.1371/journal.pcbi.1005278. PMID: 28103227; PMCID: PMC5245793, retrieved from <https://www.ncbi.nlm.nih.gov/pmc/articles/PMC5245793/> on Sep. 26, 2024 (15 pages).

Kate Vitasek, "Collaborative Bidding? It's Not an Oxymoron", Forbes, updated Jun. 26, 2018, retrieved from <https://www.forbes.com/sites/katevitasek/2018/06/26/collaborative-bidding-its-not-an-oxymoron/> on Sep. 26, 2024 (5 pages).

"Analyzing Bids and Awarding Events", Oracle, People Soft Strategic Sourcing 9.1 PeopleBook, 13 pages, retrieved from <https://docs.oracle.com/cd/E27605_01/fscm91pbr2/eng/psbooks/mssg/chapter.htm?File=mssg/htm/mssg16.htm> on Sep. 26, 2024.

"Ensuring Data Integrity with Hash Codes", Microsoft, Jan. 3, 2023, retrieved from <https://learn.microsoft.com/en-us/dotnet/standard/security/ensuring-data-integrity-with-hash-codes> on Sep. 26, 2024 (3 pages).

Menno van Zaanen, "Bootstrapping Structure using Similarity", arXiv:cs/0104005v1, Apr. 3, 2001, retrieved from <https://arxiv.org/abs/cs/0104005> on Oct. 23, 2024 (11 pages).

Bacher et al., "A Non-Parametric Subspace Analysis Approach with Application to Anomaly Detection Ensembles", arXiv:2101.04932, Jan. 13, 2024, retrieved from https://arxiv.org/abs/2101.04932 on Oct. 23, 2024 (41 pages).

Prothero et al., "Data Integration Via Analysis of Subspaces (DIVAS)", arXiv:2212.00703, Jan. 18, 2024, retrieved from https://arxiv.org/abs/2212.00703, on Oct. 23, 2024 (52 pages).

N. Godewithana and G. Kirindage, "Intelligent Hybrid Chatbot Solution for Archaeological Sites Tracking", 2021 6th International Conference on Inventive Computation Technologies (ICICT), Coimbatore, India, 2021, https://ieeexplore.ieee.org/document/9358784?source=IQplus (Year 2021), pp. 517-522 (6 pages).

* cited by examiner

Data
200

Data Corroboration
Process
202

Degree of
Corroboration
206

Database
204

MANAGING CORROBORATED DATA

FIELD

Embodiments disclosed herein relate generally to managing data used to provide computer-implemented services. More particularly, embodiments disclosed herein relate to systems and methods to manage corroborated data.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
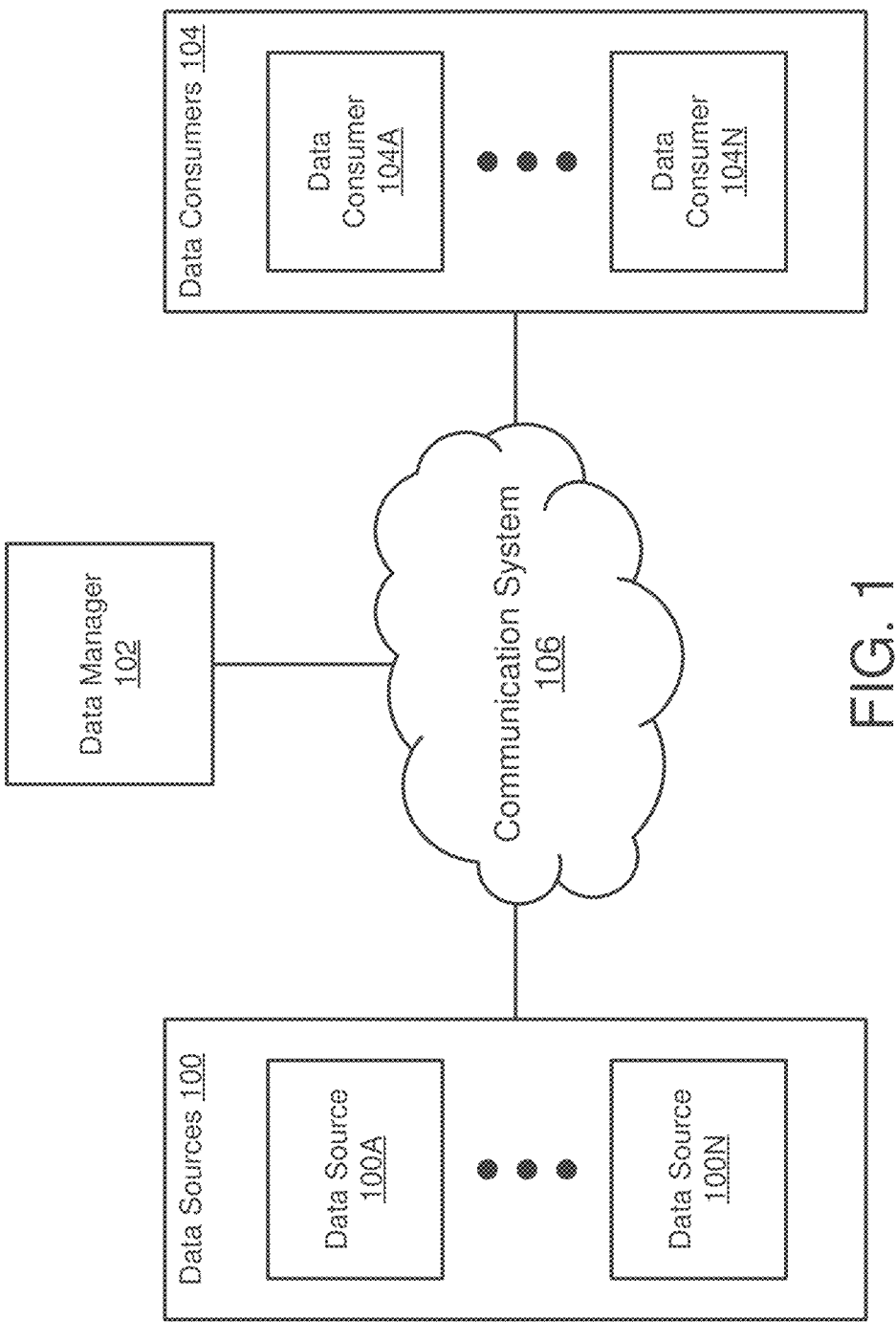
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data used to provide computer-implemented services. The data may include any type and/or quantity of data obtained from any number of data sources, and a quality of the computer-implemented services may be impacted by a quality of the data. For example, inclusion of synthetic data (e.g., generated by a generative artificial intelligence (AI) model) in a dataset may reduce a quality of the dataset, thereby reducing a quality of computer-implemented services provided using the dataset.

For example, a data consumer may use the dataset to train an inference model (e.g., an artificial intelligence (AI) model) and/or the dataset may be used to generate prompts (e.g., ingest) for the inference model. Consequently, computer-implemented services provided using outputs from the inference model may be negatively impacted (e.g., may not meet needs of the data consumer and/or other downstream consumers).

To improve a likelihood of providing non-synthetic data to data consumers, a corroborated data database may be populated with corroborated (e.g., non-synthetic) data. To do so, upon generation of non-synthetic data, a corroboration procedure may be performed using the data and other data from other data sources to obtain the corroborated data. For example, first data to be corroborated may be obtained from a first data source having a first information content. To corroborate the first data, second data may be obtained from a second data source which has a second information content. The second data source may be a known non-synthetic data source (e.g., data collected by the second data source may be trusted as non-synthetic data) and may attempt to measure a similar information content as the first information content.

For example, the first data source may be a motion sensor device and the second data source may be a security camera positioned to collect video footage of an environment in which the first data source is positioned to collect motion data. Consequently, video footage from the second data source may be usable to corroborate data collected by the first data source (e.g., instances of motion capture).

During the corroboration procedure, a corroboration process may be performed to determine whether the first information content substantially matches the second information content (e.g., including any number of similarity analysis processes to compare the first information content and the second information content and based on any criteria for substantially matching). If it is determined that the first information content does not substantially match the second information content, it may be concluded that the second data source does not corroborate the first data. If it is determined that the first information content substantially matches the second information content, it may be concluded that the second data source corroborates the first data to obtain corroborated data.

Performing the corroboration procedure may also include assigning a level of trust to the corroborated data. The corroborated data may be assigned a level of trust using a corroboration schema, which may include a rule set for assigning levels of trust to data based on degrees of corroboration of the data. The corroborated data may then be stored in the corroborated data database. Upon obtaining a request for the corroborated data from a data consumer, the corroborated data may be obtained from the corroborated data database which has an information content desired by the data consumer and meets a threshold level of trust indicated by the request. At least a portion of the corroborated data may be provided to the data consumer, and may be used to facilitate provisioning of the computer-implemented services (e.g., used for inference model training).

Thus, embodiments disclosed herein may address, among other technical problems, the technical challenge of providing data to a data consumer that meets the expectations of the data consumer and is usable to facilitate provisioning of computer-implemented services. By corroborating the data using other data from other data sources, corroborated data may be provided to the data consumer with an acceptable level of trust that the data is not synthetic. In doing so, a likelihood of providing computer-implemented services in a desired manner may be increased.

In an embodiment, a method for managing data used to provide computer-implemented services is disclosed. The method may include: obtaining a request for corroborated data from a data consumer, the request indicating a desired information content and a threshold level of trust for the corroborated data; obtaining, based on the request, the corroborated data from a corroborated data database, the corroborated data having the desired information content and being assigned a level of trust that meets the level of trust threshold, the corroborated data being obtained by a first data source and corroborated using at least one other data source, the at least one other data source being adapted to measure a similar information content to the desired information content which the first data source is adapted to measure, and the level of trust being based on a corroboration schema; and providing at least a portion of the corroborated data to the data consumer to facilitate provisioning of the computer-implemented services.

The method may also include: prior to obtaining the request from the data consumer: obtaining first data to be corroborated from the first data source, the first data having a first information content; obtaining second data from a second data source, the second data having a second information content and the second data source attempting to measure a similar information content as the first information content; performing a corroboration process to determine whether the first information content substantially matches the second information content; in a first instance of the performing in which the first information content substantially matches the second information content: concluding that the second data source corroborates the first data to obtain the corroborated data; assigning, based on at least the second data and the corroboration schema, the level of trust for the corroborated data; storing the corroborated data in the corroborated data database; and in a second instance of the performing in which the first information content does not substantially match the second information content: concluding that the second data source does not corroborate the first data.

The corroboration schema may include a rule set for assigning levels of trust to data based on degrees of corroboration of the data.

The degrees of corroboration may be based on a quantity of aspects of the data which are corroborated.

The aspects may include at least one type of aspect selected from a list of types of aspects consisting of: a portion of a third information content of the data; a timestamp of the data; and a geographic location where the data was collected.

The degrees of corroboration may be based on a quantity of data sources which corroborate the data, and the rule set may assign higher levels of trust with higher degrees of corroboration.

The corroborated data may be deemed to be corroborated based on the at least one other data source: having provided an information content of data generated by the data source substantially matching the desired information content; and not supplying synthetic data.

The corroborated data may not be synthetic data.

Obtaining the corroborated data from the corroborated data database may include: performing a lookup in the corroborated data database using the desired information content as a key to identify at least one entry; and selecting, from one of the at least one entry, the corroborated data which both has the desired information content and meets the threshold level of trust.

The corroborated data database may include an immutable ledger including entries that are cryptographically verifiable.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include any type and quantity of computer-implemented services. For example, the computer-implemented services may include data storage services, instant messaging services, database services, data generation services, and/or any other type of service that may be implemented with a computing device. Provision of the computer-implemented services may be facilitated, at least in part, using data obtained from any number of data sources.

To facilitate the provision of the computer-implemented services, a data consumer may obtain data (e.g., from a data source, from a third-party data manager). A quality of the computer-implemented services may be impacted by a quality of the data used to provide the computer-implemented services. For example, inclusion of synthetic data (e.g., data generated by a generative artificial intelligence (AI) model) in a dataset may reduce a quality of the dataset (e.g., by not reflecting real-world conditions), thereby reducing a quality of the computer-implemented services provided using the dataset. Inclusion of synthetic data in the dataset may also reduce a trustworthiness of the dataset and/or the computer-implemented services provided using the dataset. Thus, synthetic data may have a reduced likelihood of meeting the needs of the data consumer and/or a downstream consumer of the computer-implemented services.

In general, embodiments disclosed herein may provide methods, systems, and/or devices for increasing a likelihood of providing non-synthetic data to data consumers. To do so, non-synthetic data may be corroborated using other data from other data sources to obtain corroborated data. The corroborated data may be assigned a level of trust using a corroboration schema and stored in a corroborated data database. The corroborated data may then be provided to a data consumer to facilitate provisioning of computer-implemented services (e.g., to train inference models) with an acceptable level of trust that the data is not synthetic. In doing so, a likelihood of providing computer-implemented services in a desired manner may be increased.

To do so, first data to be corroborated may be obtained from a first data source, the first data having a first information content. To corroborate the first data, second data having a second information content may be obtained from a second data source which may attempt to measure a similar information content as the first information content. The second data may be trusted as non-synthetic (e.g., the second data source may be known to collect measurements reflective of real-world conditions) and, therefore, may be usable to corroborate the first data as non-synthetic.

A corroboration process may be performed to determine whether the first information content substantially matches the second information content. If the first information content does not substantially match the second information content, it may be concluded that the second data source does not corroborate the first data. If the first information content substantially matches the second information content, it may be concluded that the second data source corroborates the first data to obtain corroborated data.

The corroborated data may be assigned, based on at least the second data and the corroboration schema, a level of trust for the corroborated data. The corroboration schema may include a rule set for assigning levels of trust to data based on degrees of corroboration of the data. The degrees of corroboration of the data may be based on a quantity of aspects of the data which are corroborated (e.g., a portion of a third information content of the data, a timestamp for the data, a geographic location where the data was collected) and/or a quantity of data sources which corroborate the data. The rule set may assign higher levels of trust with higher degrees of corroboration. The corroborated data and/or the assigned level of trust may be stored in a corroborated data database, which may include an immutable ledger including entries that are cryptographically verifiable (e.g., a blockchain).

The corroborated data may be provided to the data consumer upon obtaining a request for the corroborated data from the data consumer. The request may include a desired information content and a threshold level of trust for the corroborated data. Based on the request, the corroborated data may be obtained from the corroborated data database, the corroborated data having the desired information content and a level of trust that meets the level of trust threshold. At least a portion of the corroborated data may then be provided to the data consumer to facilitate provisioning of computer-implemented services.

By doing so, embodiments disclosed herein may improve a likelihood that data consumers obtain corroborated data which is not synthetic and is usable to facilitate provisioning of computer-implemented services. By corroborating non-synthetic data using other data sources upon generation of the non-synthetic data, a level of trust may be assigned to the corroborated data which may be used to determine whether a trustworthiness of the data meets the expectations of the data consumers. In addition, resources (e.g., computing resources, time resources, cognitive resources of an SME) may be conserved that may otherwise be allocated to attempting to retroactively determine whether previously generated data is synthetic. Consequently, use of the corroborated data may increase a likelihood of providing the computer-implemented services in a desired manner.

To provide the above noted functionality, the system of FIG. 1 may include data sources 100, data manager 102, data consumers 104, and communication system 106. Each of these components is discussed below.

Data sources 100 may include any number of data sources (e.g., 100A-100N). Each data source of data sources 100 may include hardware and/or software components configured to obtain data, store data, provide data to other entities, and/or to perform any other task to facilitate provisioning of computer-implemented services. All, or a portion of, data sources 100 may provide data used to facilitate provisioning of the computer-implemented services to various computing devices operably connected to data sources 100. Different data sources may facilitate the provisioning of similar and/or different computer-implemented services.

Data sources 100 may include any type of devices adapted to collect, generate, and/or otherwise obtain data which is not synthetic (e.g., not generated by a generative AI model). For example, data sources 100 may include (i) sensors (e.g., motion sensors, temperature sensors, pressure sensors, infrared sensors), (ii) cameras (e.g., security cameras, traffic cameras, smartphone cameras), (iii) location tracking (e.g., global positioning system (GPS)) devices (e.g., GPS vehicle trackers, asset trackers, GPS-enabled smartphones), (iv) smart devices (e.g., smart streetlights, smart cars), (v) audio recording devices (e.g., microphones), (vi) connectivity devices (e.g., cell towers, Wi-Fi routers), and/or (vii) other types of data sources. Each data source of data sources 100 may be adapted to obtain any type of data, such as numerical data, audio, images, video, text, etc.

The data obtained by data sources 100 may be provided to data manager 102, which may provide data management services for consumers of the data (e.g., data consumers 104). Data manager 102 may include any number and/or type of devices such as data processing systems. To provide the data management services, data manager 102 may: (i) obtain data (e.g., from data sources 100), (ii) process the data (e.g., fill data gaps, transform the data, extract values from the data), (iii) perform corroboration procedures to obtain corroborated data and/or levels of trust for the corroborated data (e.g., determine whether a second data source corroborates first data, assign the levels of trust to the corroborated data), (iv) store the corroborated data in a corroborated data database, and/or (v) perform other tasks.

As part of performing the corroboration procedures, data manager 102 may: (i) obtain first data to be corroborated from a first data source which has a first information content, (ii) obtain second data from a second data source which has a second information content, the second data source attempting to measure a similar information content as the first information content (e.g., information extracted from the second data may be similar to the first information content), and/or (iii) compare the first information content and the second information content to determine whether the first information content substantially matches the second information content (e.g., based on any criteria for matching determined by a SME, data consumer, and/or any other entity). If the first information content does not substantially match the second information content, it may be concluded that the second data source does not corroborate the first data. If the first information content does substantially match the second information content, it may be concluded that the second data source corroborates the first data to obtain corroborated data.

Any number of other data sources may be used to corroborate the first data, and each data source may corroborate at least one aspect of the first data. The at least one aspect may include: (i) a portion of a third information content of the first data, (ii) a timestamp for the first data, (iii) a geographic location where the first data was collected, and/or (iv) other aspects. Refer to the description of FIG. 2A for additional details regarding performing corroboration procedures.

Upon obtaining corroborated data, data manager 102 may assign a level of trust to the corroborated data. The level of trust may indicate a trustworthiness that the corroborated data is not synthetic data. To assign the level of trust, data manager 102 may: (i) obtain a corroboration schema, the corroboration schema including a rule set for assigning levels of trust to data based on degrees of corroboration of the data (e.g., a quantity of data sources which corroborate the data and/or a quantity of aspects of the data which are corroborated), and/or (ii) identify, based on the corroboration schema and the degrees of corroboration of the data, the level of trust for the data. The corroboration schema may include a rule set which assigns higher levels of trust with higher degrees of corroboration (e.g., a larger quantity of data sources which corroborate the data and/or a larger quantity of aspects of the data which are corroborated indicate the data is more trustworthy). Refer to the description of FIG. 2B for additional details regarding assigning a level of trust to corroborated data.

The corroborated data, the level of trust, and/or any portion of the data used to corroborate the corroborated data may be stored in a corroborated data database. The corroborated data database may include an immutable ledger including entries that are cryptographically verifiable (e.g., a blockchain). By doing so, data verifying a trustworthiness that the corroborated data is not synthetic data may be stored with the corroborated data and/or used to prove corroboration to consumers of the corroborated data (e.g., data consumers 104).

Data consumers 104 may provide and/or consume all, or a portion of, the computer-implemented services. Data consumers 104 may include any number of data consumers (e.g., 100A-100N) and may include, for example, businesses, individuals, and/or devices (e.g., data processing systems) that may obtain the corroborated data and/or other information based on the corroborated data to facilitate provisioning of the computer-implemented services. For example, data consumers 104 may use the corroborated data to train any number of inference models to generate responses when provided with ingest data. The responses may be used as a computer-implemented service and/or to provide the computer-implemented services to downstream consumers of the computer-implemented services.

Each data consumer of data consumers 104 may have different requirements for trustworthiness of the corroborated data. For example, a first level of trust threshold for data consumer 104A may require the corroborated data to have a first level of trust that the data is not synthetic, while a second level of trust threshold for data consumer 104B may require the corroborated data to have a second level of trust that the data is not synthetic (e.g., the first level of trust may be a higher level of trust than the second level of trust). When providing a request for corroborated data (e.g., to data manager 102), data consumers 104 may include a desired level of trust for the corroborated data, a desired information content of the corroborated data, and/or other information. Refer to the description of FIG. 2C for additional details regarding requesting corroborated data.

When providing their functionality, any of (and/or components thereof) data sources 100, data manager 102, and/or data consumers 104 may perform all, or a portion, of the actions and methods illustrated in FIGS. 2A-3B.

Any of (and/or components thereof) data sources 100, data manager 102, and/or data consumers 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to the discussion of FIG. 5.

Any of the components illustrated in FIG. 1 may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

The system described in FIG. 1 may be used to manage data to improve an availability and/or quality of computer-implemented services provided to downstream consumers of the computer-implemented services. The following processes described in FIGS. 2A-2C may be performed by the system in FIG. 1 when providing this functionality.

Figure 2A:
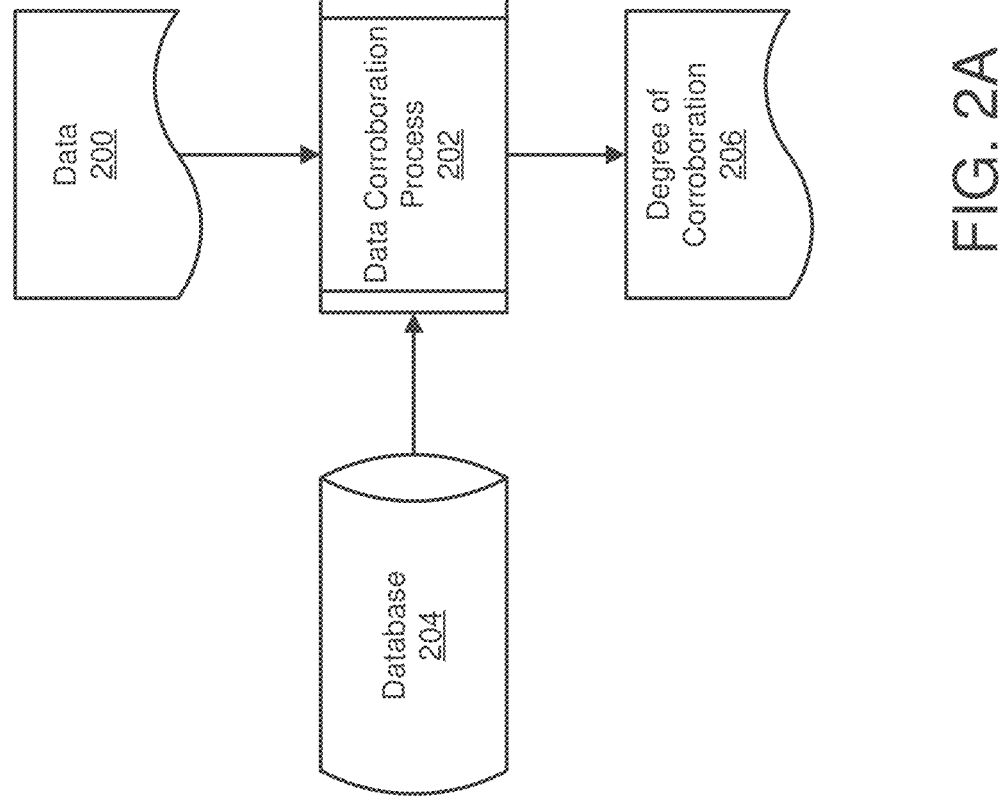
FIGS. 2A-2C show diagrams illustrating data flows in accordance with an embodiment.
Figure 2B:
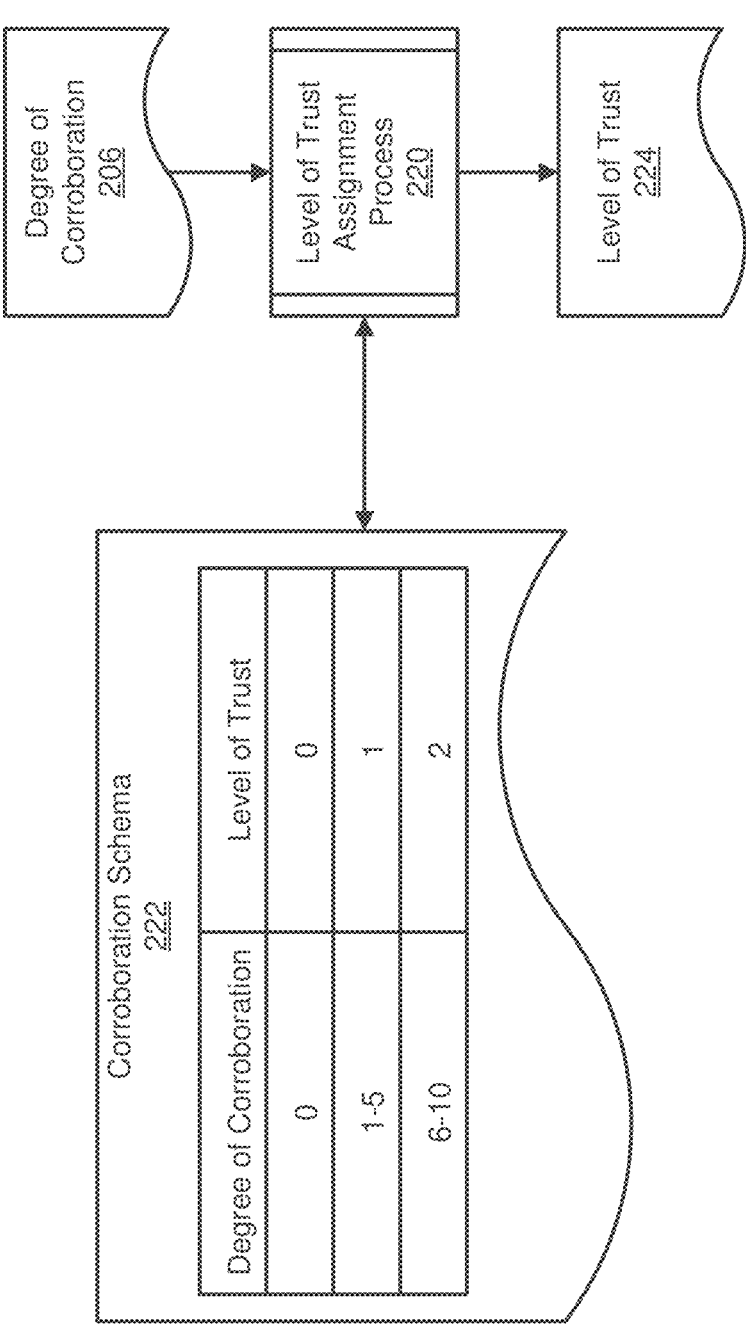
Figure 2C:
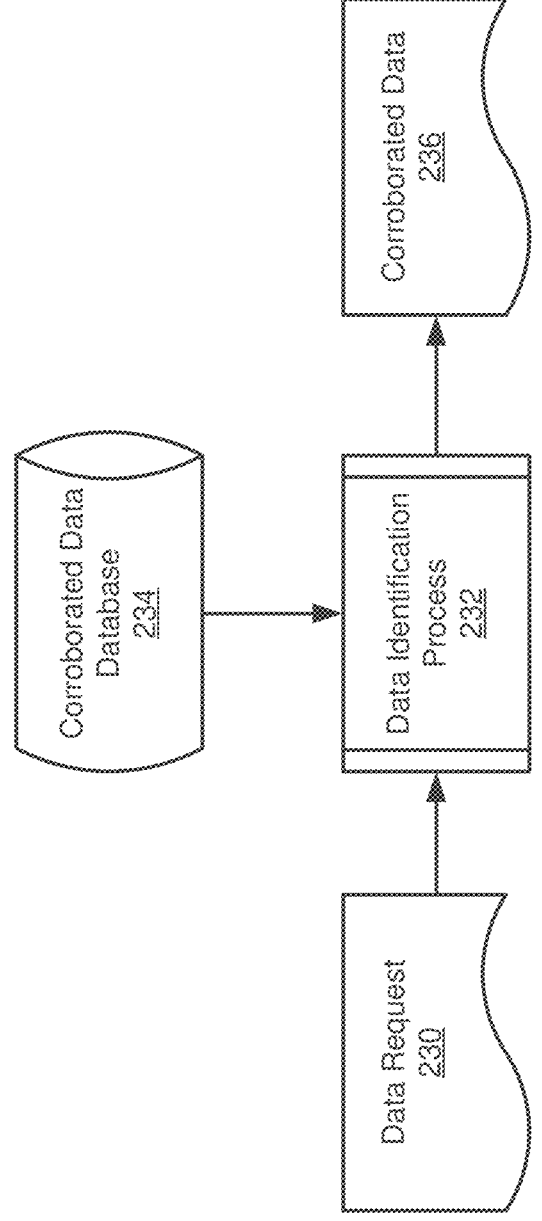

To further clarify embodiments disclosed herein, data flow diagrams in accordance with an embodiment are shown in FIGS. 2A-2C. In these diagrams, flows of data and processing of data are illustrated using different sets of shapes. A first set of shapes (e.g., 200, 206, etc.) is used to represent data structures, a second set of shapes (e.g., 202, 220, etc.) is used to represent processes performed using and/or that generate data, and a third set of shapes (e.g., 204, 234) is used to represent large scale data structures such as databases.

Turning to FIG. 2A, a first data flow diagram in accordance with an embodiment is shown. The first data flow diagram may illustrate data used in and data processing performed in performing, at least in part, a corroboration procedure for data (e.g., data 200) to obtain a degree of corroboration (e.g., degree of corroboration 206). The processes described in FIG. 2A may be performed prior to obtaining a request for corroborated data from a data consumer.

To obtain degree of corroboration 206, data corroboration process 202 may be performed using data 200. Data 200 may include any type and/or quantity of data obtained from a data source (not shown) which is not synthetic data (e.g., not generated by a generative AI model). For example, data 200 may include measurements reflective of real-world conditions obtained from sensors, cameras, smart devices, etc. and may include data such as numerical data, audio, images, video, text, etc.

Data 200 may include first data to be corroborated from a first data source, and may also include metadata for the first data. The metadata may include: (i) any number and/or type of information contents for the first data, (ii) a GPS location for the first data source, (iii) ambient environment measurements (e.g., temperature measurements) for the first data source, (iv) timestamps for measurements collected by the first data source, (v) cellular and/or other types of connection information for the first data source, and/or (vi) other types of metadata.

The information contents may include information extracted from the data, such as: (i) entities depicted by an image and/or video (e.g., people, objects, geographic markers), (ii) quantities and/or other types of numerical information (e.g., a number of times an event occurred in a video recording), (iii) a number of objects depicted by an image, (iv) statistical characterizations of a dataset, (v) sounds captured by a video and/or audio recording (e.g., conversations, animals, background noises such as a train sound), and/or (vi) other information.

For example, data 200 (e.g., the first data) may include an image of a traffic intersection obtained by a traffic camera (e.g., the first data source). Data 200 may include metadata such as a number of people on a sidewalk depicted by the image (e.g., a first information content), a license plate number for a car depicted by the image (e.g., a third information content), a timestamp when the image was taken, and a GPS location for the traffic camera which captured the image.

Once obtained from the first data source, data 200 may be used to perform data corroboration process 202. During data corroboration process 202, other data from other data sources may be obtained from database 204 to attempt to corroborate data 200. Database 204 may include a database used to store any type and/or quantity of data obtained from other data sources (e.g., data sources which are not the first data source) which are not synthetic data and may also include metadata for the data. The data stored in database 204 may include data obtained from sensors, cameras, smart devices, etc. and may include data such as numerical data, audio, images, video, text, etc.

For example, during data corroboration process 202, second data from a second data source may be obtained from database 204. The second data may have a second information content and the second data source may attempt to measure a similar information content as the first information content (e.g., information extracted from the second data may include information similar to the first information content of data 200). The second data source may be trusted to provide non-synthetic data (e.g., the second data may include measurements of real-world conditions).

For example, the second data source may include any type of data source which obtains any type of data, and may not be limited to a type of data source as the first data source and/or a type of data as the first data. For example, the first data may include video of a building entrance obtained by a video camera, and the second data may include sensor data measured by a motion sensor on a door to the building. The motion sensor data may indicate a number of times the door opened, which may be used to corroborate the video showing people entering the building. The video camera and the motion sensor may not be controlled by the same entity, thereby increasing a trust in using the sensor data to corroborate the video.

Returning to the example where the first data includes an image of a traffic intersection obtained by a traffic camera, the first data may have a first information content including a number of people on a sidewalk depicted by the image. To corroborate the first data, second data may be obtained from a second data source which attempts to measure the number of people on the sidewalk at a same time that the first data source attempted to measure similar information content. For example, the second data source may include a security camera which collects timestamped video of the sidewalk. The second data may include a second information content including the number of people on the sidewalk.

As part of performing data corroboration process 202, a corroboration process may be performed to determine whether the first information content of the first data (e.g., data 200) substantially matches the second information content of the second data (e.g., from database 204). Performing the corroboration process may include performing any number and/or type of analysis and/or verification processes using any criteria for substantially matching (e.g., determined by a SME, data consumer, and/or any other entity). For example, performing the corroboration process may include comparing a quantity of the first information content to a quantity of the second information content to obtain a difference. The quantity of the first information content may include, for example, a number of instances of a motion sensor being activated and the quantity of the second information content may include a number of people seen entering a building. The quantity of the first information content and the quantity of the second information content may be obtained over a same duration of time and, therefore, the number of instances of the motion sensor being activated may indicate people entering the building. Therefore, the difference may indicate an extent to which the motion sensor was activated by the people entering the building. The difference may be compared to the criteria for substantially matching to determine whether the first information content substantially matches the second information content.

For example, criteria for determining whether the first information content substantially matches the second information content may (i) permit a 10% difference (e.g., at least 90% of the first information content and the second information content matches), (ii) permit a 5% difference (e.g., at least 95% of the first information content and the second information content matches), (iii) permit a 2% difference (e.g., at least 98% of the first information content and the second information content matches), and/or (iv) include other criteria to be deemed substantially matching.

It will be appreciated that the criteria for determining whether the first information content substantially matches the second information content may vary based on a type and/or other characteristic of the information content. For example, a quantity of the first information content and the second information content may be permitted to differ by 10%, while other types of information contents, such as geographic location coordinates, may be permitted to differ by 2%.

Continuing with the above example, the number of people on the sidewalk indicated by the first information content may be compared to the number of people on the sidewalk indicated by the second information content to obtain a difference. For example, the difference may indicate that the number of people on the sidewalk differs by 3%. The difference may be compared to criteria for substantially matching determined by a consumer of the first data, which may indicate the number of people on the sidewalk may differ by 5% to be considered substantially matching. Therefore, in this example, it may be determined that the first information content and the second information content substantially match.

If it is determined that the first information content substantially matches the second information content, it may be concluded that the second data source corroborates the first data (e.g., data 200) to obtain corroborated data. The corroborated data may be deemed to be corroborated based on the second data source: (i) having provided the second information content of the second data generated by the second data source that substantially matches the first information content, (ii) not supplying synthetic data, and/or (iii) other criteria. Continuing with the above example, it may be concluded, based on the first information content substantially matching the second information content, that the security camera corroborates the first data obtained by the traffic camera, and the first data may be treated as corroborated data.

If it is determined that the first information content does not substantially match the second information content, it may be concluded that the second data source does not corroborate the first data. If the second data source does not corroborate the first data, other data from other data sources (e.g., from database 204) may be evaluated to determine whether any of the other corroborates the first data and/or the first data may be rejected for use as corroborated data.

Performing data corroboration process 202 may include obtaining a degree of corroboration for the corroborated data (e.g., degree of corroboration 206). Degree of corroboration 206 may be based on any number of factors, and may be represented as a numerical scale (e.g., from 0 to 10 with higher numbers indicating higher trustworthiness) and/or via any other means.

For example, degree of corroboration 206 may be based on: (i) a quantity of data sources which corroborate data 200, (ii) a quantity of aspects of data 200 which are corroborated, and/or (iii) other criteria. The aspects may include any type of aspect, characteristic, and/or metadata of data 200, which may include: (i) a portion of a third information content of data 200, (ii) a timestamp for data 200, (iii) a geographic location where data 200 was collected, and/or (iii) other information.

To determine a quantity of data sources which corroborate data 200, information content of data from any number of additional data sources may be compared to the first information content of data 200. For example, the first information content of data 200 may be compared to a third information content of third data from a third data source and a fourth information content of fourth data from a fourth data source. If it is determined that the first information content substantially matches the third information content and the fourth information content, it may be concluded that the third data source and the fourth data source also corroborate data 200. In this example, three data sources (e.g., the second data source, the third data source and the fourth data source) may corroborate data 200.

Continuing with the above example, the number of people on the sidewalk indicated by the first data obtained by the traffic camera may be corroborated by the second data obtained by the security camera. The number of people on the sidewalk indicated by the first data obtained by the traffic camera may also be compared to the number of people on the sidewalk indicated by the third data obtained by a smartphone camera (e.g., the third data source) and the fourth data obtained by a second security camera (e.g., the fourth data source). If it is determined that the number of people on the sidewalk indicated by first data substantially matches the number of people on the sidewalk indicated by the third data and the fourth data, it may be concluded that the security camera, the smartphone camera, and the second security camera corroborate the first data, and, therefore, three data sources corroborate the first data.

To determine the quantity of aspects of data 200 which are corroborated, the aspects of data 200 may be compared to aspects of each data source that corroborates data 200. For example, a first aspect of data 200 may include the first information content and a second aspect of data 200 may include a third information content which may be corroborated using any number of data sources. Other aspects of data 200 (e.g., a timestamp for data 200, a geographic location where data 200 was collected) may also be corroborated by data included in database 204.

Continuing with the above example, the first data obtained by the traffic camera may include a third information content including a license plate number for a car. The license plate number indicated by the first data may be compared to a license plate number indicated by fifth data obtained from a drone (e.g., a fifth data source). If it is determined that the license plate numbers substantially match, it may be concluded that the drone corroborates the second aspect of the first data (e.g., the third information content). The first data may also include a GPS location for the traffic camera used to obtain the first data, which may be compared to a GPS location for the drone. If it is determined that the GPS location for the traffic camera and the GPS location for the drone substantially match, it may be concluded that the drone corroborates a third aspect of the first data. Thus, two aspects of data 200 may be corroborated by the drone. Similar methods may be performed for each corroborating data source to determine a number of aspects of data 200 that are corroborated by each corroborating data source.

Degree of corroboration 206 may be assigned to corroborated data based on any formula and/or schema that takes into account information including: (i) the quantity of data sources which corroborate the corroborated data, (ii) the quantity of aspects of the corroborated data which are corroborated, and/or (iii) other information. For example, if it is concluded that two aspects of the first data are corroborated by two data sources (e.g., each of the two data sources separately corroborates both of the two aspects), the first data may be assigned a degree of corroboration of four. In this example, a schema for assigning degrees of corroboration may include a numerical scale where each aspect of data that is corroborated by each corroborating data source increases the degree of corroboration by one starting from a degree of corroboration of zero. Degrees of corroboration may be assigned based on any other schema without departing from embodiments disclosed herein.

Turning to FIG. 2B, a second data flow diagram in accordance with an embodiment is shown. The second data flow diagram may illustrate data used in and data processing performed in obtaining a level of trust (e.g., level of trust 224) for corroborated data using a corroboration schema (e.g., corroboration schema 222) based on degree of corroboration 206.

To obtain level of trust 224, level of trust assignment process 220 may be performed. During level of trust assignment process 220, degree of corroboration 206 may be used to search corroboration schema 222 for a level of trust associated with degree of corroboration 206. Corroboration schema 222 may include a rule set for assigning levels of trust to data based on degrees of corroboration of the data. The rule set may, for example, assign higher levels of trust with higher degrees of corroboration (e.g., data with a higher degree of corroboration may be deemed more trustworthy than data with a lower degree of corroboration).

Corroboration schema 222 may be organized as a table, including a series of columns and rows as shown in FIG. 2B, with a first column including degrees of corroboration and a second column including levels of trust corresponding to the degrees of corroboration indicated by the first column. The degrees of corroboration included in the first column may be represented in any manner including, for example, numbers, letters, characters, and/or any combination thereof. The levels of trust included in the second column may be represented in any manner including, for example, numbers, letters, characters, and/or any combination thereof.

A level of trust for data may indicate to a consumer of the data a trustworthiness that the data is not synthetic based on the degree of corroboration. For example, a higher (e.g., based on a numerical scale between 0-10 where 0 indicates the lowest degree of corroboration and 10 indicates the highest degree of corroboration) degree of corroboration may indicate that more data sources corroborated the data and/or more aspects of the data were able to be corroborated when compared to data assigned a lower degree of corroboration, which may increase a data consumer's ability to trust that the data was not generated by a generative AI model, simulation, and/or other synthetic method. Conversely, a lower degree of corroboration may indicate that fewer data sources corroborated the data and/or fewer aspects of the data were able to be corroborated when compared to data assigned a higher degree of corroboration, which may indicate to the data consumer that there may be an increased likelihood that the data was generated by a generative AI model and/or a decreased likelihood that the data is reflective of real-world conditions.

For example, degree of corroboration 206 may include a degree of corroboration of five for corroborated data. Using the degree of corroboration and corroboration schema 222, level of trust 224 may be obtained, which may include a level of trust of one for the corroborated data. Level of trust 224 may include a level of trust of 1 as shown in corroboration schema 222. In this example, levels of trust may be assigned based on a scale of 0-2 with higher numbers being associated with higher degrees of corroboration and, therefore, higher trustworthiness.

While the corroboration schema shown in FIG. 2B is shown as associating specific degrees of corroboration with levels of trust, it will be appreciated that any degree of corroboration and/or range of degrees of corroboration may be associated with any level of trust without departing from embodiments disclosed herein.

Upon obtaining level of trust 224, the corroborated data, level of trust, any data used to corroborate the corroborated data, and/or any other information may be stored in a corroborated data database. Refer to the description of FIG. 2C for additional details regarding the corroborated data database.

Turning to FIG. 2C, a third data flow diagram in accordance with an embodiment is shown. The third data flow diagram may illustrate data used in and data processing performed in providing corroborated data (e.g., corroborated data 236) to a data consumer upon obtaining a request for the corroborated data (e.g., data request 230).

To provide the corroborated data to the data consumer, data identification process 232 may be performed. During data identification process 232, data request 230 may be obtained. Data request 230 may include a request for the corroborated data from the data consumer, and may: (i) indicate a desired information content of the corroborated data, (ii) include a threshold level of trust for the corroborated data, and/or (iii) include a request for other data, such as data used to corroborate the corroborated data. Data request 230 may be obtained, for example, by an entity responsible for maintaining corroborated data database 234 (e.g., data manager 102, not shown).

For example, data request 230 may indicate a desired information content including a number of times a door to the entrance of a store was opened on February 12$^{th}$ with at least a level of trust of 2 (e.g., on a scale of 0-2, with 0 being the lowest level of trust and 2 being the highest level of trust).

Corroborated data database 234 may include an immutable ledger including entries that are cryptographically verifiable (e.g., a blockchain). For example, corroborated data database 234 may be implemented as a blockchain where each entry includes metadata blocks chained together to form an immutable (e.g., non-editable) data structure. The metadata blocks may be added to the blockchain using any method (e.g., consensus, proof of work, proof of interest) and may include: (i) the corroborated data and/or a hash of the corroborated data, (ii) the level of trust and/or a hash of the level of trust, (iii) the data used to corroborate the corroborated data and/or a hash of the data used to corroborate the corroborated data, (iv) entity identifiers indicating entities which added the metadata blocks, (v) authentication data usable to validate that the entities which added the metadata blocks are trusted entities (e.g., cryptographically verifiable signatures), and/or (vi) other data.

Modification of an entry of corroborated data database 234 may be restricted to trusted entities. To determine whether an entry in corroborated data database 234 is trusted (e.g., was not modified by an unauthorized entity), authentication data for each metadata block may be used to validate the entry. Validating the entry may include: (i) comparing the entity identifiers to those of trusted entities to attempt to find a match (e.g., lack of a match may indicate that the corresponding entry is not to be trusted), (ii) using the authentication data in each respective metadata block to validate that the metadata block was, in fact, added by the entity identified by the entity identifier (e.g., using a public key of a public private key pair maintained by the entity to validate that the signature was added by the entity). For example, a unilateral or bilateral authentication process may be performed using the authentication data (or through a third, intermediate entity such as an authentication service). If all the metadata blocks are indicated to be added by a trusted entity and can be authenticated, then the entry may be trusted. Otherwise, the entry may not be trusted.

As part of performing data identification process 232, corroborated data 236 may be obtained, based on data request 230, from corroborated data database 234. To obtain corroborated data 236, a lookup may be performed in corroborated data database 234 using the desired information content as a key to identify at least one entry which includes the desired information content. From one of the at least one entry, corroborated data 236 may be selected which both has the desired information content and meets the threshold level of trust. Corroborated data 236 may have the desired information content and may be assigned a level of trust that meets the level of trust threshold.

For example, a data consumer may request corroborated data including images of trees (e.g., the desired information content) to train an inference model. The data consumer may indicate in the request that the images of trees are to have a least a level of trust of two (e.g., the threshold level of trust). Upon obtaining the request, a lookup in corroborated data database 234 may be performed to identify entries including images of trees. Based on the lookup, for example, three entries may be identified, each including a level of trust of one, one, and two respectively. The corroborated data may be selected from the entry which includes the level of trust of two in order to meet the threshold level of trust.

Upon selecting corroborated data 236, a response to data request 230 may be provided to the data consumer to facilitate provisioning of computer-implemented services. The response may include: (i) at least a portion of corroborated data 236, (ii) the corresponding level of trust, (iii) data used to corroborate corroborated data 236, and/or (iv) other data, such as any other metadata blocks included in the entry in corroborated data database 234 which includes corroborated data 236.

If an entry is unable to be identified which includes the desired information content and/or meets the threshold level of trust indicated by data request 230, data manager 102 may (i) provide an error message to the data consumer, the error message indicating that acceptable corroborated data was unable to be identified from corroborated data database 234, (ii) provide a counter proposal to the data consumer, and/or (iii) perform other actions. For example, the counter proposal may include corroborated data from corroborated data database 234 which has the desired information content, but does not meet the threshold level of trust.

Thus, by implementing the data flows shown in FIGS. 2A-2C, a system in accordance with embodiments disclosed herein may be used to provide corroborated data to a data consumer which meets a level of trust threshold that the corroborated data is not synthetic indicated by the data consumer. By corroborating data using other data from other data sources, a resource cost (e.g., computational resources, time resources, cognitive resources) of verifying data is not synthetic and/or training inference models using synthetic data may be reduced. Consequently, resources may be allocated to providing computer-implemented services and a likelihood that the computer-implemented services may be provided as desired to downstream consumers may be increased.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
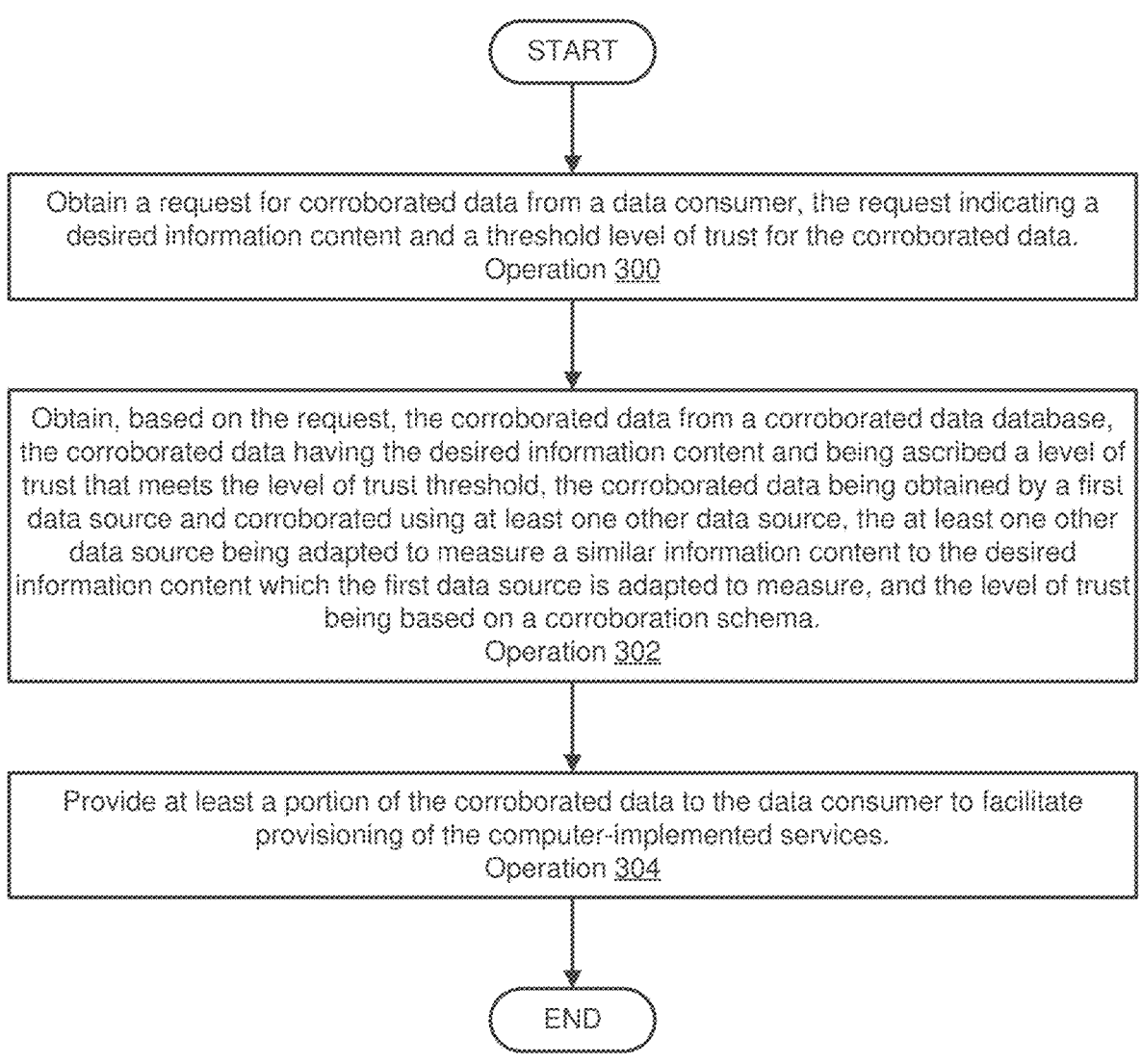
FIGS. 3A-3B show flow diagrams illustrating a method for managing data used to provide computer-implemented services in accordance with an embodiment.
Figure 3B:
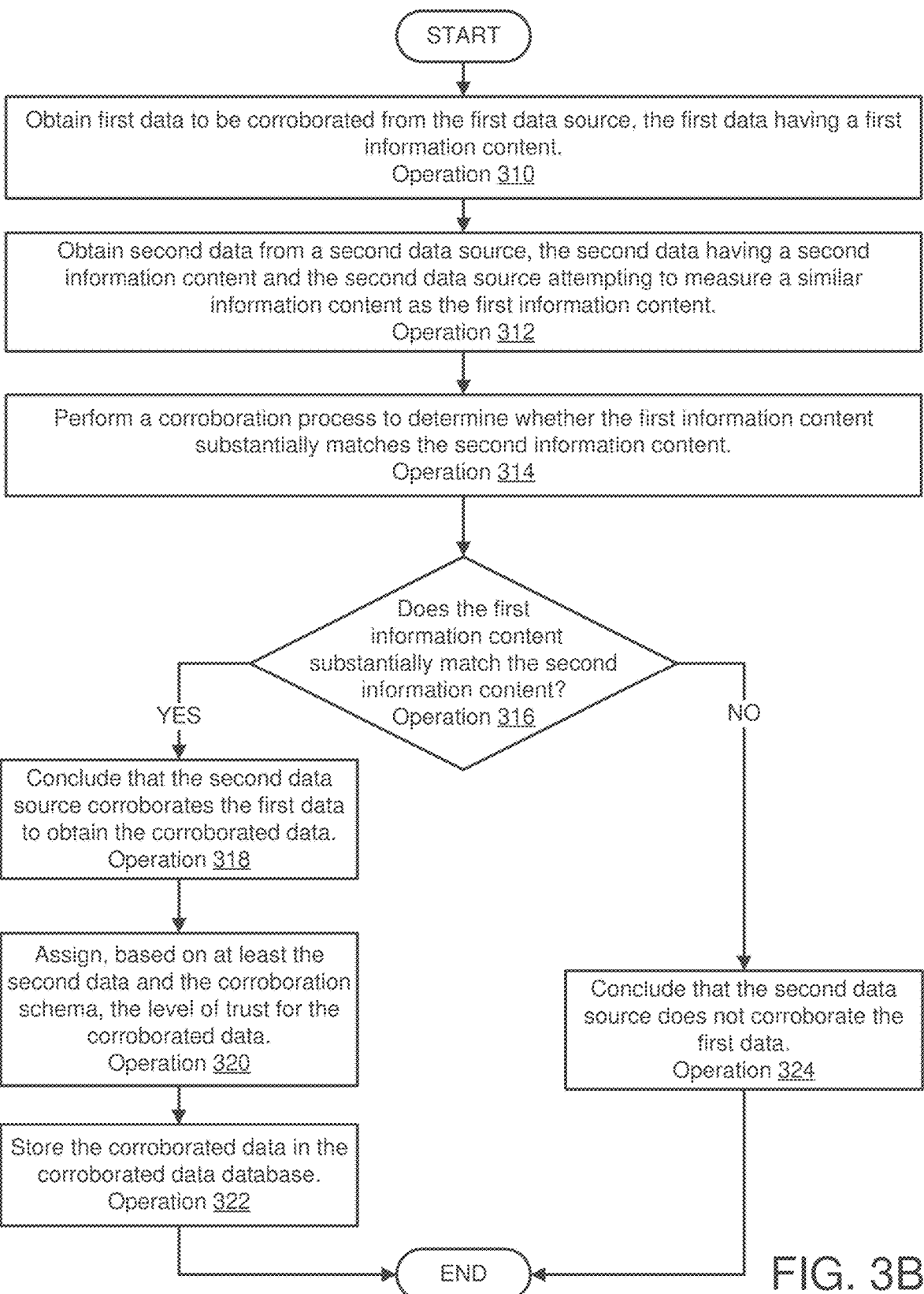

As discussed above, the components of FIGS. 1-2C may perform various methods to manage data used to provide computer-implemented services. FIGS. 3A-3B illustrate a method that may be performed by the components of the system of FIGS. 1-2C. In the diagrams discussed below and shown in FIGS. 3A-3B, any of the operations may be repeated, performed in different orders, and/or performed in parallel with or in a partially overlapping in time manner with other operations.

Turning to FIG. 3A, a first flow diagram illustrating a method for managing data used to provide computer-implemented services in accordance with an embodiment is shown. The method may be performed, for example, by any of the components of the system of FIG. 1, and/or any other entity without departing from embodiments disclosed herein.

At operation 300, a request for corroborated data may be obtained from a data consumer, the request indicating a desired information content and a threshold level of trust for the corroborated data. Obtaining the request for the corroborated data may include: (i) receiving the request from the data consumer, (ii) receiving the request from another entity (e.g., a third-party and/or intermediate entity), (iii) reading the request from storage, and/or (iv) other methods.

At operation 302, the corroborated data may be obtained from a corroborated data database based on the request. The corroborated data may have the desired information content and may be assigned a level of trust that meets the level of trust threshold. The corroborated data may be obtained by a first data source and may be corroborated using at least one other data source. The at least one other data source may be adapted to measure a similar information content to the desired information content which the first data source may be adapted to measure. The level of trust may be based on a corroboration schema.

Obtaining the corroborated data from the corroborated data database may include: (i) performing a lookup in the corroborated data database using the desired information content as a key to identify the at least one entry, (ii) selecting, from one of the at least one entry, the corroborated data which both has the desired information content and meets the threshold level of trust, and/or (iii) other methods.

Performing the lookup in the corroborated data database may include: (i) searching entries in the corroborated data database to identify the at least one entry which includes the desired information content (e.g., using the desired information content as key phrases for the search), (ii) providing the desired information content to another entity and receiving the at least one entry which includes the desired information content in response, and/or (iii) other methods.

Selecting the corroborated data may include: (i) identifying a level of trust for each entry which includes the desired information content, (ii) comparing the level of trust for each entry to the threshold level of trust, (iii) identifying at least one entry which both has the desired information content and meets the threshold level of trust, (iv) selecting the corroborated data from the identified at least one entry, and/or (v) other methods.

At operation 304, at least a portion of the corroborated data may be provided to the data consumer to facilitate provisioning of the computer-implemented services. Providing the at least a portion of the corroborated data to the data consumer may include: (i) transmitting the at least a portion of the corroborated data to the data consumer via a message, (ii) providing the at least a portion of the corroborated data to another entity (e.g., a third-party and/or intermediate entity) responsible for providing the at least a portion of the corroborated data to the data consumer, (iii) storing the at least a portion of the corroborated data in a storage with subsequent retrieval by the data consumer, and/or (iv) other methods.

The method may end following operation 304.

Turning to FIG. 3B, a second flow diagram illustrating a method in accordance with an embodiment is shown. The second flow diagram may illustrate various operations performed while corroborating first data to obtain corroborated data. The operations shown in FIG. 3B may be performed prior to performing operation 300 shown in FIG. 3A (e.g., prior to obtaining a request for corroborated data from a data consumer). The method may be performed, for example, by any of the components of the system of FIG. 1, and/or any other entity without departing from embodiments disclosed herein.

At operation 310, first data from a first data source may be obtained to be corroborated, the first data having a first information content. Obtaining the first data may include (i) reading the first data from storage (e.g., from a database), (ii) receiving the first data from another entity, (iii) generating the first data (e.g., collecting and/or measuring the first data using the first data source), and/or (iv) other methods.

At operation 312, second data from a second data source may be obtained, the second data having a second information content and the second data source attempting to measure a similar information content as the first information content. Obtaining the second data may include: (i) reading the second data from storage (e.g., from a database), (ii) receiving the second data from another entity, (iii) generating the second data (e.g., collecting and/or measuring the second data using the second data source), and/or (iv) other methods.

At operation 314, a corroboration process may be performed to determine whether the first information content substantially matches the second information content. Performing the corroboration process may include: (i) comparing the first information content to the second information content to obtain a difference, (ii) making a determination regarding whether the difference meets criteria to be considered substantially matching, and/or (iii) other methods. The difference may indicate a degree to which the second information content corroborates the first information content.

Comparing the first information content to the second information content may include performing any number and/or type of similarity analysis processes to obtain the difference. In a first example, comparing the first information content to the second information content may include: (i) obtaining a first quantity from the first information content, (ii) obtaining a second quantity from the second information content, and/or (iii) performing a statistical analysis (e.g., analysis of variance (ANOVA), regression, hypothesis testing) to obtain the difference. In a second example, comparing the first information content to the second information content may include: (i) providing the first information content and the second information content to an inference model and ingest, (ii) prompting the inference model to compare the first information content and the second information content (e.g., providing the inference model a prompt, the prompt including instructions for the inference model to compare the first information content and the second information content), and/or (iii) obtaining an output from the inference model, the output being usable to obtain the difference.

Making the determination regarding whether the difference meets criteria to be considered substantially matching may include: (i) obtaining the criteria (e.g., from a SME, data consumer, and/or any other entity), (ii) comparing a quantity of the difference to a corresponding quantity of the criteria, and/or (iii) other methods. Determining whether the difference meets the criteria may also include providing the difference and the criteria to another entity responsible for comparing the difference to the criteria.

Obtaining the criteria may include: (i) reading the criteria from storage, (ii) receiving the criteria from another entity (e.g., the data consumer, the SME), (iii) generating the criteria, and/or (iv) other methods. The criteria may include any criteria for substantially matching. For example, the criteria may: (i) permit a 10% difference (e.g., at least 90% of the first information content and the second information content matches), (ii) permit a 5% difference (e.g., at least 95% of the first information content and the second information content matches), (iii) permit a 2% difference (e.g., at least 98% of the first information content and the second information content matches), and/or (iv) include other criteria to be considered substantially matching.

At operation 316, it may be determined whether the first information content substantially matches the second information content. Determining whether the first information content substantially matches the second information content may include reading a result of the corroboration process described in operation 314.

If it is determined that the first information content substantially matches the second information content (e.g., the determination is "Yes" at operation 316), then the method may proceed to operation 318.

At operation 318, it may be concluded that the second data source corroborates the first data to obtain the corroborated data. Concluding that the second data source corroborates the first data may include: (i) generating a data structure indicating that the second data source corroborates the first data, (ii) signing the data structure using a private key of a trusted entity, the private key being part of a public private key pair usable to cryptographically verify that the entity which generated the data structure is the trusted entity, (iii) storing the data structure in a corroborated data database, and/or (iv) other methods.

At operation 320, a level of trust may be assigned for the corroborated data based on at least the second data and a corroboration schema. Assigning the level of trust may include: (i) obtaining the corroboration schema (e.g., reading the corroboration schema from storage, receiving the corroboration schema from another entity, generating the corroboration schema), (ii) obtaining a degree of corroboration for the corroborated data, (iii) using the degree of corroboration to search the corroboration schema for the level of trust associated with the degree of corroboration, and/or (iv) other methods.

Obtaining the degree of corroboration for the corroborated data may include (i) reading the degree of corroboration from storage, (ii) assigning the corroborated data the degree of corroboration based on a quantity of data sources which corroborate the data and/or based on a quantity of aspects of the data which are corroborated, (iii) providing the corroborated data to another entity and receiving the degree of corroboration in response, and/or (iv) other methods. Aspects of the data may include: (i) a portion of a third information content of the data (and/or any number of other information contents for the data), (ii) a timestamp for the data, (iii) a geographic location where the data was collected, and/or (iv) other information.

Assigning the corroborated data the degree of corroboration may include: (i) obtaining the quantity of data sources which corroborate the data, the quantity of aspects of the data which are corroborated, and/or other information usable to assign the degree of corroboration, (ii) performing a lookup process using the quantity of data sources which corroborate the data and/or the quantity of aspects of the data which are corroborated as a key for a degree of corroboration table (e.g., a lookup table), (iii) obtaining, as a result of the lookup process and from the degree of corroboration table, the degree of corroboration for the data, (iv) using the quantity of data sources which corroborate the data and/or the quantity of aspects of the data which are corroborated as the degree of corroboration, (v) calculating, using any formula and/or rule set for calculating degrees of corroboration, the degree of corroboration based on the quantity of data sources which corroborate the data, the quantity of aspects of the data which are corroborated, and/or the other information, and/or (vi) other methods.

Using the degree of corroboration to search the corroboration schema for the level of trust associated with the degree of corroboration may include: (i) performing a lookup process using the degree of corroboration as a key for the corroboration schema, (ii) obtaining, as a result of the lookup process from the corroboration schema, the level of trust, (iii) providing the degree of corroboration and/or the corroboration schema to another entity and receiving the level of trust in response, and/or (iv) other methods.

At operation 322, the corroborated data may be stored in the corroborated data database. Storing the corroborated data in the corroborated data database may include: (i) signing the corroborated data using a private key of a trusted entity, the private key being part of a public private key pair usable to cryptographically verify that the entity which signed the corroborated data is the trusted entity, (ii) generating an entry in the corroborated data database using the signed corroborated data, and/or (iii) other methods. Storing the corroborated data in the corroborated data database may also include storing the level of trust and/or other data used to corroborate the corroborated data in the corroborated data database.

The method may end following operation 322.

Returning to operation 316, if it is determined that the first information content does not substantially match the second information content (e.g., the determination is "No" at operation 316), then the method may proceed to operation 324.

At operation 324, it may be concluded that the second data source does not corroborate the first data. Concluding that the second data source does not corroborate the first data may include: (i) generating a data structure indicating that the second data source does not corroborate the first data, (ii) storing the data structure in a database and/or other storage architecture, (iii) notifying (e.g., via a message over a communication system, via a graphical user interface (GUI) on a device) another entity (e.g., the data consumer, the SME) that the second data source does not corroborate the first data, and/or (iv) other methods. Concluding the second data source does not corroborate the first data may also include not storing the first data in the corroborated data database.

If the second data source does not corroborate the first data, additional data sources may be evaluated to determine whether any of the additional data sources corroborate the first data. Determining whether any of the additional data sources corroborate the first data may include methods similar to those described in operations 312-316.

The method may end following operation 324.

Thus, as illustrated above, embodiments disclosed herein may provide systems and methods usable to obtain corroborated data used to facilitate provisioning of computer-implemented services. By obtaining the corroborated data by performing a corroboration process using other data from other data sources, a level of trust may be assigned to the corroborated data indicating a trustworthiness that the corroborated data is not synthetic data. The corroborated data may then be provided to a data consumer in a manner which meets the expectations of the data consumer. By doing so, a likelihood of providing the computer-implemented services as desired may be increased.

Figure 4:
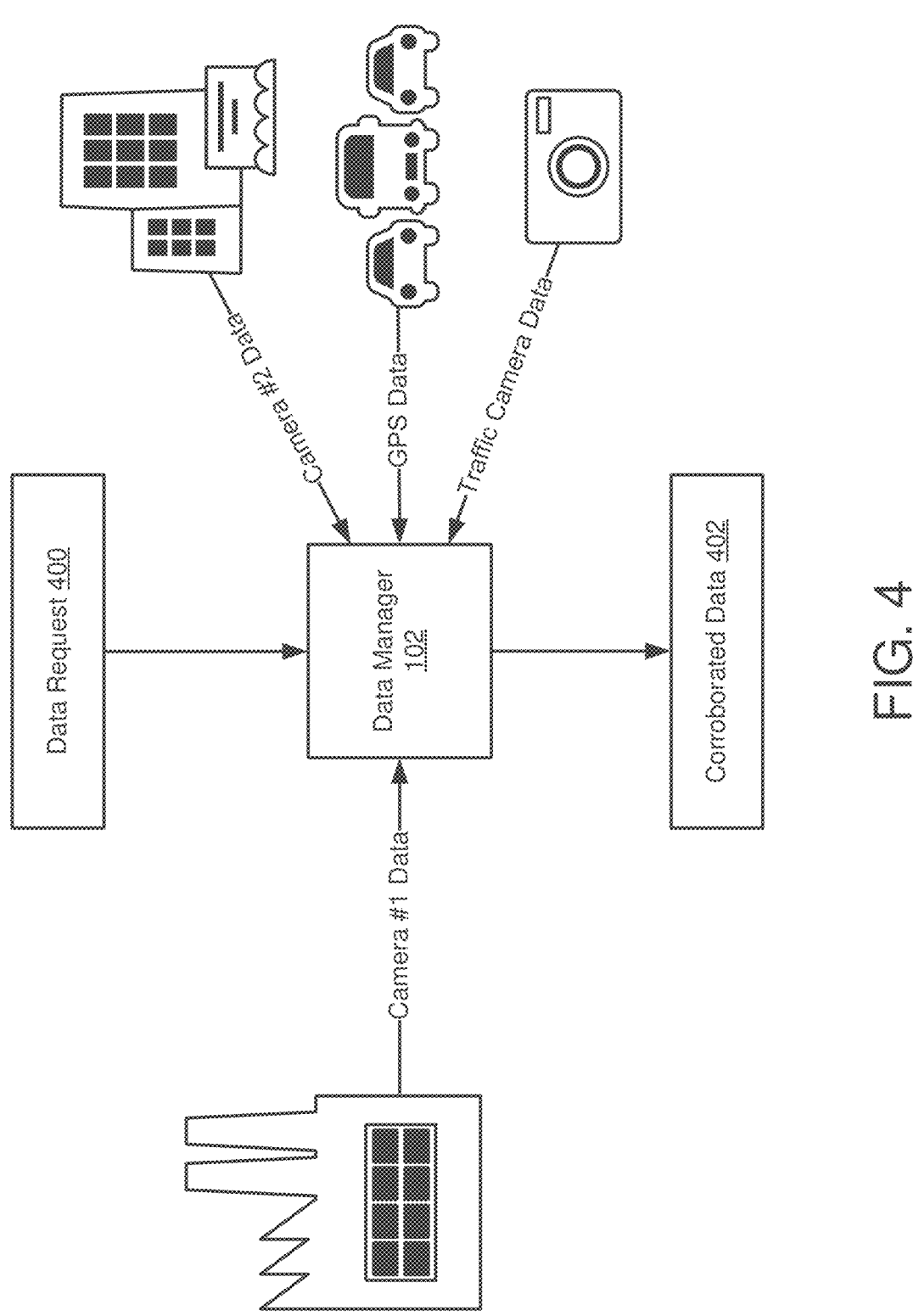
FIG. 4 shows a diagram illustrating an example of obtaining corroborated data in accordance with an embodiment.

To further clarify embodiments disclosed herein, an example implementation in accordance with an embodiment is shown in FIG. 4. Turning to FIG. 4, a diagram illustrating an example of providing corroborated data (e.g., corroborated data 402) to a data consumer upon obtaining a request for the corroborated data (e.g., data request 400) is shown.

Consider a scenario in which data manager 102 manages security data for a factory. As part of managing the security data, data manager 102 may obtain data from any number of data sources, store data, corroborate data, and/or provide corroborated data to a security data consumer upon obtaining a request for the corroborated data.

For example, data manager 102 may obtain first security camera data including video of the factory entrance (e.g., camera #1 data). Upon obtaining the camera #1 data, data manager 102 may corroborate the camera #1 data. To do so, data manager 102 may obtain other data from other data sources, which may include: (i) video of the factory entrance obtained by a second security camera positioned on a building across the street (e.g., camera #2 data), (ii) location data obtained by smart car GPS systems from cars parked in the factory parking lot (e.g., GPS data), and/or (iii) images of the factory entrance obtained by a traffic camera (e.g., traffic camera data). The other data sources may be owned, operated, and/or otherwise managed by entities which do not manage the first security camera (e.g., the other data sources may not be in the same sphere of trust as the first security camera).

To corroborate the camera #1 data, data manager 102 may compare a first information content from the camera #1 data to an information content from each of the other data from the other data sources. For example, the first information content may include a number of people who entered the factory on April $28^{th}$ measured by the first security camera (e.g., 127 people), and a second information content may include the number of people who entered the factory on April $28^{th}$ measured by the second security camera (e.g., 128 people). Using criteria for substantially matching, data manager 102 may determine that the first information content substantially matches the second information content and, thus, it may be concluded that the second security camera corroborates the camera #1 data.

A similar corroboration process may be performed using other data from each of the other data sources. Data manager 102 may conclude that each of the three other data sources corroborates the camera #1 data. Based on the quantity of data sources which corroborates the camera #1 data and a corroboration schema, data manager 102 may assign the camera #1 data a level of trust of 3 (e.g., on a scale of 1-10, with 1 being the lowest level of trust and 10 being the highest level of trust). The camera #1 data may then be stored in a corroborated data database.

While managing the security data for the factory, data manager 102 may obtain data request 400 from the security data consumer. Data request 400 may include a request for video of the factory entrance on April $28^{th}$ which has a threshold level of trust of 2. Upon obtaining data request 400, data manager 102 may perform a lookup in the corroborated data database to identify entries which include the video of the factory entrance on April $28^{th}$, and may select an entry which includes the camera #1 data having the level of trust of 3 (e.g., which meets the threshold level of trust). Data manager 102 may then provide corroborated data 402 to the security data consumer, which may include the camera #1 data.

Figure 5:
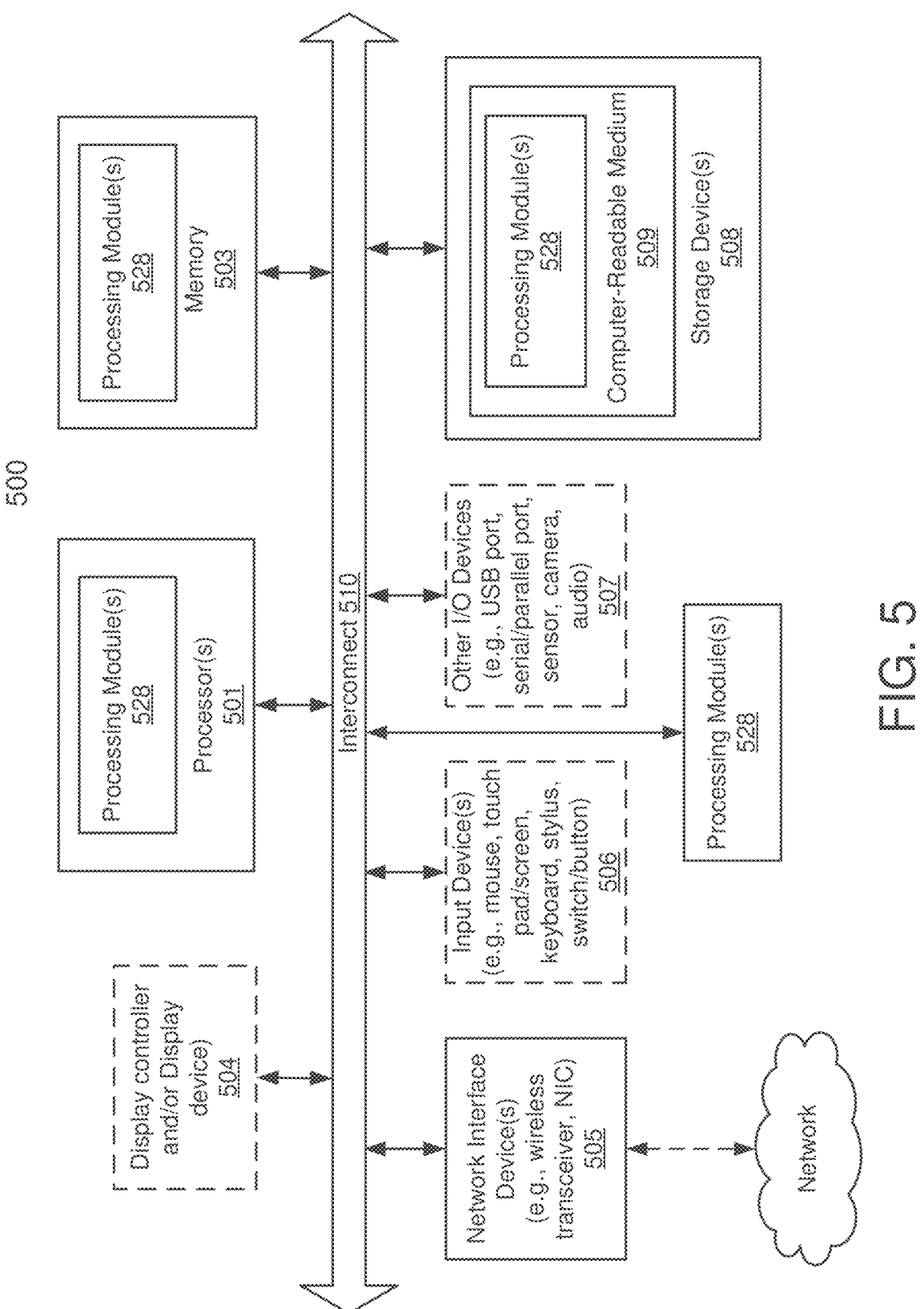
FIG. 5 shows a block diagram illustrating a data processing system in accordance with an embodiment.

Any of the components illustrated in FIGS. 1-4 may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing data used to provide computer-implemented services, the method comprising:

obtaining a request for corroborated data from a data consumer, the request indicating a desired information content and a threshold level of trust for the corroborated data;

obtaining, based on the request, the corroborated data from a corroborated data database, the corroborated data is non-synthetic data, the corroborated data having the desired information content and being assigned a level of trust that meets the level of trust threshold, the corroborated data being obtained by a first data source and corroborated using at least one other data source, the at least one other data source being adapted to measure a similar information content to the desired information content which the first data source is adapted to measure, and the level of trust being based on a corroboration schema; and providing at least a portion of the corroborated data to the data consumer to facilitate provisioning of the computer-implemented services using the non-synthetic data, wherein prior to obtaining the request from the data consumer, the method further comprises:

obtaining first data to be corroborated from the first data source, the first data having a first information content;

obtaining second data from a second data source, the second data having a second information content and the second data source attempting to measure a similar information content as the first information content;

performing a corroboration process to determine whether the first information content matches the second information content, the corroboration process consists of only determining a difference between the first information content and the second information content using one or more statistical analysis techniques and determining whether the difference meets a pre-set matching criteria, the one or more statistical analysis techniques comprising at least one of analysis of variance (ANOVA), regression, or hypothesis testing;

in a first instance of the performing in which the first information content matches the second information content: concluding that the second data source corroborates the first data to obtain the corroborated data; assigning, based on at least the second data and the corroboration schema, the level of trust for the corroborated data; and storing the corroborated data in the corroborated data database as the non-synthetic data; and in a second instance of the performing in which the first information content does not match the second information content: concluding that the second data source does not corroborate the first data.

2. The method of claim 1, wherein the corroboration schema comprises a rule set for assigning levels of trust to data based on degrees of corroboration of the data.

3. The method of claim 2, wherein the degrees of corroboration are based on a quantity of aspects of the data which are corroborated.

4. The method of claim 3, wherein the aspects comprise at least one type of aspect selected from a list of types of aspects consisting of:

a portion of a third information content of the data;

a timestamp for the data; and a geographic location where the data was collected.

5. The method of claim 2, wherein the degrees of corroboration are based on a quantity of data sources which corroborate the data, and the rule set assigns higher levels of trust with higher degrees of corroboration.

6. The method of claim 1, wherein the corroborated data is deemed to be corroborated based on the at least one other data source:

having provided an information content of data generated by the data source matching the desired information content; and not supplying synthetic data.

7. The method of claim 1, wherein obtaining the corroborated data from the corroborated data database comprises:

performing a lookup in the corroborated data database using the desired information content as a key to identify at least one entry; and selecting, from one of the at least one entry, the corroborated data which both has the desired information content and meets the threshold level of trust.

8. The method of claim 1, wherein the corroborated data database comprises an immutable ledger comprising entries that are cryptographically verifiable.

9. A non-transitory machine-readable medium having instructions stored therein, which when executed by a processor, cause the processor to perform operations for managing data used to provide computer-implemented services, the operations comprising:

obtaining a request for corroborated data from a data consumer, the request indicating a desired information content and a threshold level of trust for the corroborated data;

obtaining, based on the request, the corroborated data from a corroborated data database, the corroborated data is non-synthetic data, the corroborated data having the desired information content and being assigned a level of trust that meets the level of trust threshold, the corroborated data being obtained by a first data source and corroborated using at least one other data source, the at least one other data source being adapted to measure a similar information content to the desired information content which the first data source is adapted to measure, and the level of trust being based on a corroboration schema; and providing at least a portion of the corroborated data to the data consumer to facilitate provisioning of the computer-implemented services using the non-synthetic data, wherein prior to obtaining the request from the data consumer, the operations further comprise:

obtaining first data to be corroborated from the first data source, the first data having a first information content;

obtaining second data from a second data source, the second data having a second information content and the second data source attempting to measure a similar information content as the first information content;

performing a corroboration process to determine whether the first information content matches the second information content, the corroboration process consists of only determining a difference between the first information content and the second information content using one or more statistical analysis techniques and determining whether the difference meets a pre-set matching criteria, the one or more statistical analysis techniques comprising at least one of analysis of variance (ANOVA), regression, or hypothesis testing;

in a first instance of the performing in which the first information content matches the second information content: concluding that the second data source corroborates the first data to obtain the corroborated data; assigning, based on at least the second data and the corroboration schema, the level of trust for the corroborated data; and storing the corroborated data in the corroborated data database as the non-synthetic data; and in a second instance of the performing in which the first information content does not match the second information content: concluding that the second data source does not corroborate the first data.

10. The non-transitory machine-readable medium of claim 9, wherein the corroboration schema comprises a rule set for assigning levels of trust to data based on degrees of corroboration of the data.

11. The non-transitory machine-readable medium of claim 10, wherein the degrees of corroboration are based on a quantity of aspects of the data which are corroborated.

12. The non-transitory machine-readable medium of claim 11, wherein the aspects comprise at least one type of aspect selected from a list of types of aspects consisting of:

a portion of a third information content of the data;

a timestamp for the data; and a geographic location where the data was collected.

13. A data processing system, comprising:

a processor; and a memory coupled to the processor to store instructions, which when executed by the processor, cause the processor to perform operations for managing data used to provide computer-implemented services, the operations comprising:

obtaining a request for corroborated data from a data consumer, the request indicating a desired information content and a threshold level of trust for the corroborated data;

obtaining, based on the request, the corroborated data from a corroborated data database, the corroborated data is non-synthetic data, the corroborated data having the desired information content and being assigned a level of trust that meets the level of trust threshold, the corroborated data being obtained by a first data source and corroborated using at least one other data source, the at least one other data source being adapted to measure a similar information content to the desired information content which the first data source is adapted to measure, and the level of trust being based on a corroboration schema; and providing at least a portion of the corroborated data to the data consumer to facilitate provisioning of the computer-implemented services using the non-synthetic data, wherein prior to obtaining the request from the data consumer, the operations further comprise:

obtaining first data to be corroborated from the first data source, the first data having a first information content;

obtaining second data from a second data source, the second data having a second information content and the second data source attempting to measure a similar information content as the first information content;

performing a corroboration process to determine whether the first information content matches the second information content, the corroboration process consists of only determining a difference between the first information content and the second information content using one or more statistical analysis techniques and determining whether the difference meets a pre-set matching criteria, the one or more statistical analysis techniques comprising at least one of analysis of variance (ANOVA), regression, or hypothesis testing;

in a first instance of the performing in which the first information content matches the second information content: concluding that the second data source corroborates the first data to obtain the corroborated data; assigning, based on at least the second data and the corroboration schema, the level of trust for the corroborated data; and storing the corroborated data in the corroborated data database as the non-synthetic data; and in a second instance of the performing in which the first information content does not match the second information content: concluding that the second data source does not corroborate the first data.

14. The data processing system of claim 13, wherein the corroboration schema comprises a rule set for assigning levels of trust to data based on degrees of corroboration of the data.

15. The data processing system of claim 14, wherein the degrees of corroboration are based on a quantity of aspects of the data which are corroborated.

16. The data processing system of claim 15, wherein the aspects comprise at least one type of aspect selected from a list of types of aspects consisting of:

a portion of a third information content of the data;

a timestamp for the data; and a geographic location where the data was collected.

17. The non-transitory machine-readable medium of claim 10, wherein the degrees of corroboration are based on a quantity of data sources which corroborate the data, and the rule set assigns higher levels of trust with higher degrees of corroboration.

18. The non-transitory machine-readable medium of claim 9, wherein the corroborated data is deemed to be corroborated based on the at least one other data source:

having provided an information content of data generated by the data source matching the desired information content; and not supplying synthetic data.

19. The data processing system of claim 14, wherein the degrees of corroboration are based on a quantity of data sources which corroborate the data, and the rule set assigns higher levels of trust with higher degrees of corroboration.

20. The data processing system of claim 13, wherein the corroborated data is deemed to be corroborated based on the at least one other data source:

having provided an information content of data generated by the data source matching the desired information content; and not supplying synthetic data.

* * * * *